(12) United States Patent
Shikama (10) Patent No.: US 11,516,398 B2
(45) Date of Patent: Nov. 29, 2022

(54) ANTI-VIBRATION MECHANISM FOR IMAGING ELEMENT, CAMERA AND ELECTRONIC DEVICE

(71) Applicant: Changzhou Raytech Optronics Co., Ltd., Changzhou (CN)

(72) Inventor: Kazuo Shikama, Osaka (JP)

(73) Assignee: Changzhou Raytech Optronics Co., Ltd., Changzhou (CN)

( * ) Notice: Subject to any disclaimer, the term of this patent is extended or adjusted under 35 U.S.C. 154(b) by 0 days.

(21) Appl. No.: 17/138,934

(22) Filed: Dec. 31, 2020

(65) Prior Publication Data

US 2022/0201213 A1 Jun. 23, 2022

(30) Foreign Application Priority Data

Dec. 21, 2020 (JP) .............................. JP2020-211297

(51) Int. Cl.
| | |
|---|---|
| H04N 5/232 | (2006.01) |
| G03B 5/00 | (2021.01) |
| G03B 5/04 | (2021.01) |
| G03B 13/36 | (2021.01) |
| H04N 5/225 | (2006.01) |

(52) U.S. Cl.
CPC ........... *H04N 5/23287* (2013.01); *G03B 5/00* (2013.01); *G03B 5/04* (2013.01); *G03B 13/36* (2013.01); *H04N 5/2253* (2013.01); *H04N 5/2257* (2013.01); *G03B 2205/0023* (2013.01); *G03B 2205/0046* (2013.01)

(58) Field of Classification Search
CPC .. H04N 5/2253; H04N 5/2254; H04N 5/2257; H04N 5/23287; G02B 27/64; G02B 27/646; G03B 2205/0007; G03B 2205/0038

See application file for complete search history.

(56) References Cited

U.S. PATENT DOCUMENTS

| | | | | |
|---|---|---|---|---|
| 2015/0201127 | A1* | 7/2015 | Ahn | G03B 5/02 348/208.99 |
| 2017/0139225 | A1* | 5/2017 | Lim | G02B 7/08 |
| 2017/0324892 | A1* | 11/2017 | Kim | H04N 5/2252 |
| 2017/0324905 | A1* | 11/2017 | Yu | H04N 5/23258 |
| 2021/0048728 | A1* | 2/2021 | Wu | G02B 13/0065 |
| 2021/0149210 | A1* | 5/2021 | Fukushima | G02B 27/646 |
| 2021/0208417 | A1* | 7/2021 | Choi | G03B 3/10 |
| 2021/0258491 | A1* | 8/2021 | Park | G02B 7/09 |
| 2021/0281759 | A1* | 9/2021 | Seo | G03B 13/36 |
| 2021/0289111 | A1* | 9/2021 | Lim | H04N 5/2253 |
| 2022/0163814 | A1* | 5/2022 | Seo | G03B 3/10 |

\* cited by examiner

*Primary Examiner* — Paul M Berardesca
(74) *Attorney, Agent, or Firm* — W&G Law Group (57) ABSTRACT

In a camera device that includes a hand tremor correction mechanism, an anti-vibration mechanism for the camera device is provided. An optical system that is movable in an optical axis direction and includes a focus adjustment mechanism is provided in the camera device, includes an anti-vibration mechanism that performs hand tremor correction by anti-vibration of the imaging element, and includes from an object side, an imaging lens group, the anti-vibration mechanism, and an imaging element provided on the anti-vibration mechanism, and a plane perpendicular to the optical axis of the imaging lens group is used as a movement plane to allow the imaging element on the anti-vibration mechanism to move, so as to achieve hand tremor correction.

9 Claims, 8 Drawing Sheets

ANTI-VIBRATION MECHANISM FOR IMAGING ELEMENT, CAMERA AND ELECTRONIC DEVICE

TECHNICAL FIELD

The present invention relates to an anti-vibration mechanism for camera device, an optical system, a camera and an electronic device with a function of correcting hand tremor.

BACKGROUND

With the rapid development of imaging technology, image-shooting devices with lens driving are widely used in a large number of camera devices. Various portable electronic devices (such as portable phones, tablet computers, etc.) that use camera devices including lens driving are particularly popular with consumers.

Generally, a driving mechanism of a lens driving device suitable for a conventional portable electronic device is integrally formed by an autofocus mechanism that adjusts the focus in an optical axis direction and a hand tremor correction mechanism that drives in a plane perpendicular to the optical axis direction.

These two functions are obtained by means of a coil and a magnet. The coil is fixed at an outer periphery of a lens holder. When a current is applied to the coil, due to an action of an electromagnetic force, the coil drives the lens holder to move along the optical axis direction of the lens, thereby enabling focusing. In addition, when the user holds the electronic device by hands for shooting, the vibration of the lens driving device caused by hand tremor can be corrected by driving in a direction perpendicular to the optical axis.

However, for example, in an optical system such as medium-distance telephoto with a long optical total length, as a small device mounted onto a portable electronic device, it is difficult to achieve thinness and miniaturization of the hand tremor correction mechanism in an integrated mechanism due to driving length and weight of the lens.

In addition, since the autofocus mechanism that drives in the optical axis direction for adjusting the focus and the lens movement hand tremor correction mechanism for driving the lens in a plane perpendicular to the optical axis are integrally formed, it is also necessary to provide mechanisms for suppressing inherent vibration, and adjustment of lens centering, etc., therefore, the necessity of sophisticated assembling and the difficulty of design also tend to increase.

In addition, since the autofocus mechanism that drives in the optical axis direction for adjusting the focus and the lens movement hand tremor correction mechanism that drives in the plane perpendicular to the optical axis direction can make the lens barrel move three-dimensionally, it is difficult to counteract the impact when it falls, etc.

Although there is a mechanism for driving an imaging element for solving these problems, a support member thereof adopts a leaf spring, deformation when it falls may hinder normal driving, and the weight of the upper lens unit may cause tilting and sinking.

Therefore, it is necessary to provide a new camera device that can solve the above problems.

SUMMARY

The present invention aims to solve the above-mentioned problems, and a purpose of the present invention is to achieve an anti-vibration mechanism that corrects hand tremor of a camera device having a folded optical system (folded optics) while saving space without increasing a size of the camera device.

The purpose of the present invention is achieved in the following manner. In addition, for ease understanding of the present invention, the symbols in the drawings are indicated in parentheses. However, the constituting elements of the present invention are not limited to these indications, and should be broadly interpreted to the scope understood by those skilled in the art.

The present invention provides an anti-vibration mechanism for a camera device. The camera device includes an optical system that is movable in an optical axis direction and includes a focus adjustment mechanism, an imaging element, and an imaging lens group. The anti-vibration mechanism is provided in the optical system and configured to correct hand tremor by moving the imaging element in a plane perpendicular to the optical axis direction, and the anti-vibration mechanism containing the imaging element is closer to an image side than the imaging lens group, and is movable in the plane perpendicular to the optical axis direction. The anti-vibration mechanism includes: a frame assembly including a movable frame configured to move along two axes in the plane perpendicular to the optical axis direction; a ball member configured to hold the imaging element in the frame assembly to enable the imaging element to smoothly move in the frame assembly; a driving member configured to drive the imaging element to move, the driving member being an electric actuator; an integrated circuit configured to drive the electric actuator; a detection element configured to detect a position when driving; a flexible substrate configured to transmit a signal of the imaging element; and a circuit configured to supply power to a device configured to drive a lens.

As an improvement, the electric actuator includes an anti-vibration coil, and the anti-vibration coil is clamped between two anti-vibration magnets.

As an improvement, the movable frame is provided with a groove for holding the ball member.

As an improvement, an upper position of the anti-vibration mechanism is provided with a circuit for supplying a signal line for position detection of the device configured to drive the lens.

As an improvement, the frame assembly further includes a support frame, a magnetic yoke is provided on the movable frame, and the electric actuator exerts a force in a direction in which the anti-vibration magnet and the magnetic yoke attract each other.

As an improvement, the anti-vibration mechanism for the camera device further includes a base on which the imaging element is placed; the base is a plate made of metal, the support frame is made of resin, and the base and the support frame are formed into one piece.

As an improvement, a flexible substrate is configured to supply power to the electric actuator, and the flexible substrate is bent at least twice in the optical axis direction at a back side of the imaging element, corresponding to the axes along which the moveable frame for holding the imaging element moves.

As an improvement, a flexible substrate is configured to supply power to the electric actuator, and the flexible substrate is bent at least twice at a position closer to an outside than the electric actuator, corresponding to the axes along which the moveable frame for holding the imaging element moves in the plane perpendicular to the optical axis direction.

In addition, the present invention further provides an optical system, including the anti-vibration mechanism described above.

As an improvement, the optical system includes a focus adjustment mechanism, and the focus adjustment mechanism has a tilt hand tremor correction mechanism capable of tilting the lens.

As an improvement, the focus adjustment mechanism has a zoom mechanism capable of multi-stage retracting the lens for storage.

In addition, the present invention further provides a camera, including the optical system described above.

In addition, the present invention further provides a portable electronic device, including the camera described above.

As advantages of the present invention, the anti-vibration mechanism for the camera device provided by the present invention performs hand tremor correction by using two frames to move the imaging element in a plane perpendicular to the optical axis, therefore, the unit containing the focus adjustment mechanism and the lens provided on the imaging element can be thinned and miniaturized, and the lens movement hand tremor correction mechanism is omitted. Since the focus adjustment mechanism is separated from the parts of the vibration correction mechanism, inherent vibration is suppressed, and therefore the design difficulty thereof can be lowered. Since it is not necessary to move the lens barrel in three dimensions at the same time, the design difficulty in counteracting the impact when it falls can also be lowered, and centering of the lens barrel becomes easier. Since the lens does not move in a planar direction, it is possible for a smart cellphone to have the smallest lens projected aperture.

Because the support member in the mechanism for driving the imaging element does not use the leaf spring, a possibility of hindering the driving due to deformation when it falls is reduced, and tilting and sinking due to the weight of the upper lens unit is inhibited, thereby reducing an impact on the performance at the image plane.

In addition, since the vibration removing and force application can be performed by using the anti-vibration magnet and yoke of the electric actuator that serves as a component for applying a force, there is no need for other members for applying the force, thereby facilitating miniaturization and easy assembling due to great reduction of the parts.

Furthermore, the focus adjustment mechanism may also include a zoom mechanism that retracts the lens for storage. As another combination, in a case of a hand tremor correction mechanism that inhibits vibration by tilting the lens, the anti-vibration mechanism for the imaging device can be combined to achieve hand tremor correction in four axes.

With these advantages, it is possible to achieve a goal of installing a more efficient anti-vibration mechanism in a portable electronic device that advances towards miniaturization, thereby improving the quality of the captured image.

REFERENCE SIGNS

10-*a*: base A
10-*b*: base B
10-*c*: support member groove of the base
11-*a*: case A
11-*b*: case B
12-*a*: support frame
12-*b*: support member groove of the support frame
12-*c*: support member groove of the support frame
13-*a*: movable frame
13-*b*: support member groove of the movable frame
14: imaging element support frame
15: ball
20: cover plate
30: lens
30-*a*: entrance surface of the lens
30-*b*: exit surface of the lens
31: autofocus mechanism having a focus adjustment mechanism
32: telescopic zoom mechanism having a focus adjustment mechanism
40: imaging element
50: flexible substrate A
51: flexible substrate B
52: folded portion of the flexible substrate A
53: folded portion of the flexible substrate B
60: anti-vibration mechanism for imaging element
70: anti-vibration coil
71: anti-vibration Hall sensor
72: anti-vibration magnetic yoke
74: anti-vibration magnet A
75: anti-vibration magnet B
100: camera
200: portable information equipment

DESCRIPTION OF EMBODIMENTS

Hereinafter, the present invention will be described in detail with reference to the accompanying drawings.

FIG. 1 to FIG. 4 are diagrams showing a camera 100 and an anti-vibration mechanism 60 according to the present invention.

FIG. 1 to FIG. 12 illustrate a camera device and constituting elements thereof according to embodiments of the present invention.

The camera 100 with anti-vibration mechanism 60 for the imaging element including, from an object side: a lens 30; an autofocus mechanism 31 configured to drive the lens 30 and having a focus adjustment mechanism, or a telescopic zoom mechanism 32 configured to drive the lens 30 and including a focus adjustment mechanism; and an imaging element 40.

A light beam that comes from an object to be imaged and travels along the optical axis is incident onto an entrance surface 30-a of the lens and then emitted from an exit surface 30-b of the lens to form an image on an imaging surface of the imaging element 40.

Figure 1:
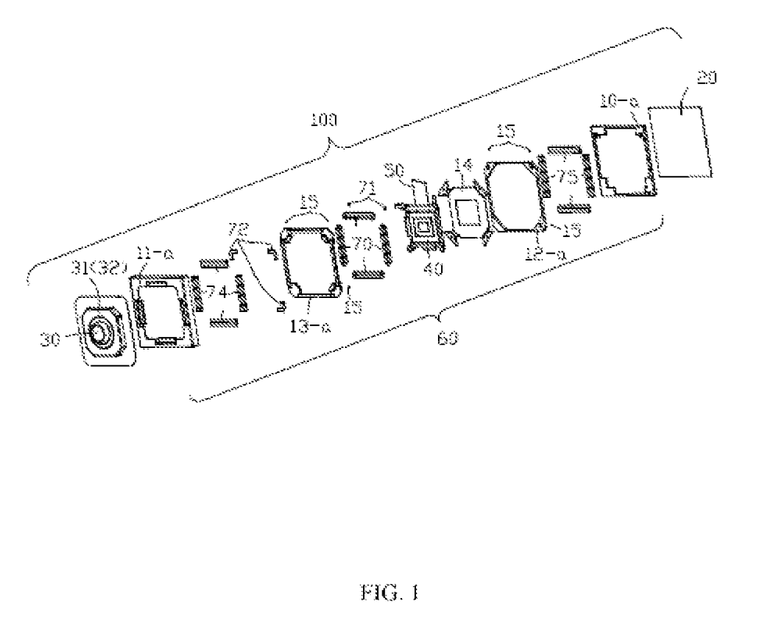
FIG. 1 is a view of a structure of a camera according to an embodiment of the present invention, the folded portion of the flexible substrate passing through a back side of an imaging element, when observed from a front side.
Figure 2:
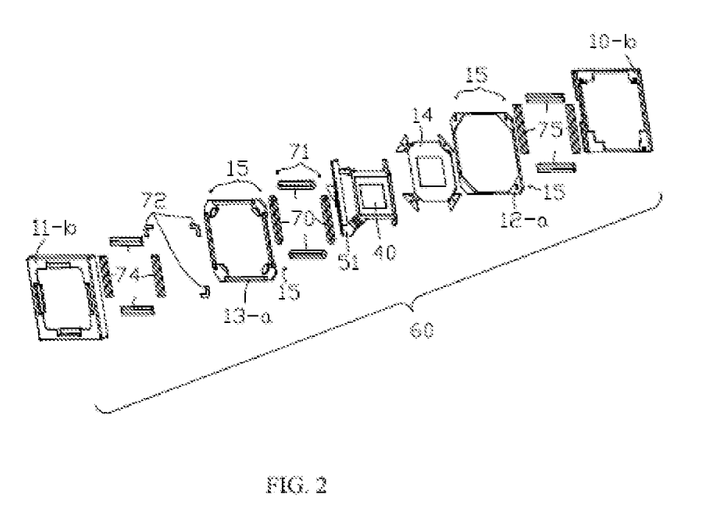
FIG. 2 is a view of a structure of an anti-vibration mechanism for the imaging element according to an embodiment of the present invention, the folded portion of the flexible substrate passing through a side surface of the frame assembly, when observed from a front side.
Figure 3:
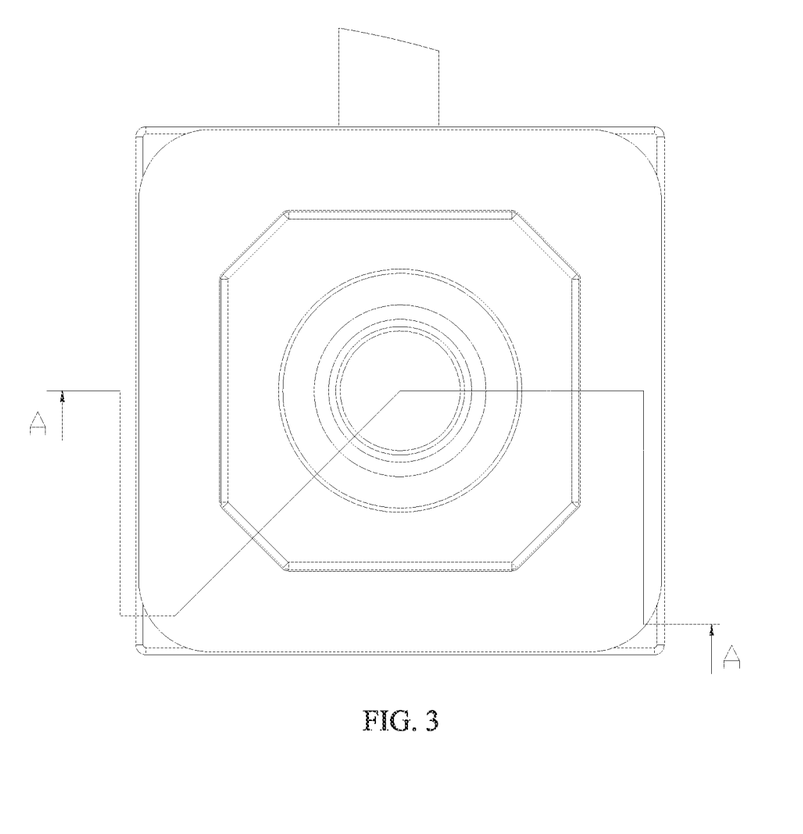
FIG. 3 is a view of a structure of the camera shown in FIG. 1.
Figure 4:
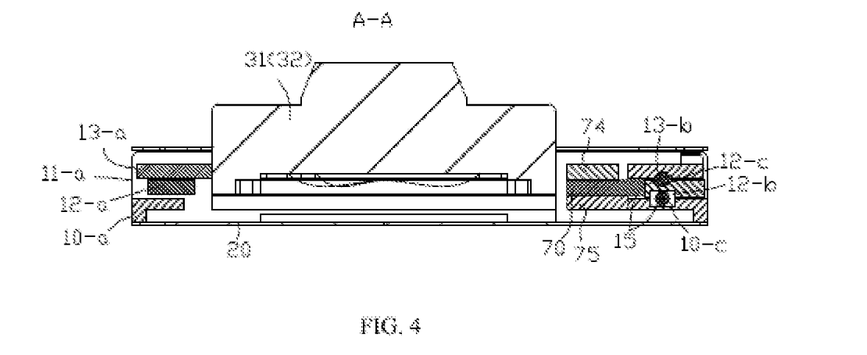
FIG. 4 is a cross-sectional view taken along A-A line of a structure of camera shown in FIG. 3.
Figure 5:
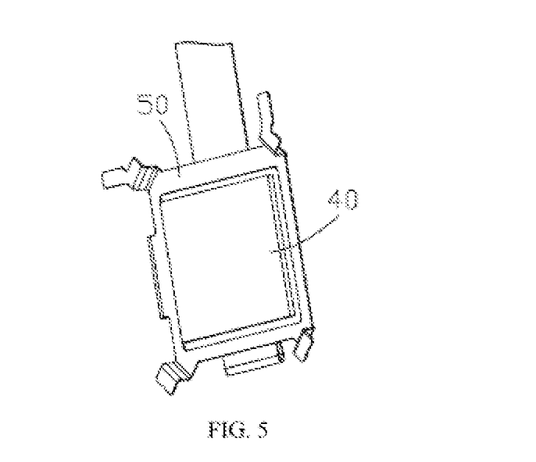
FIG. 5 is a schematic diagram of a flexible substrate according to an embodiment of the present invention when observed from an angle.
Figure 6:
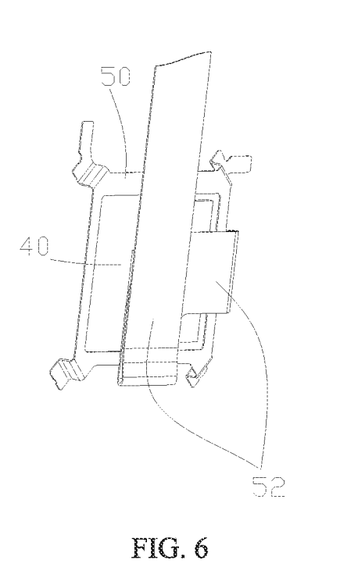
FIG. 6 is a schematic diagram of the flexible substrate shown in FIG. 5 when observed from another angle.
Figure 7:
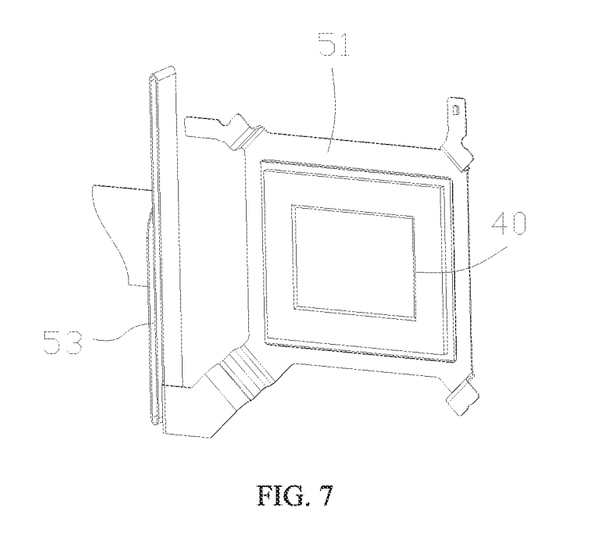
FIG. 7 is a schematic diagram of a flexible substrate according to another embodiment of the present invention when observed from an angle.
Figure 8:
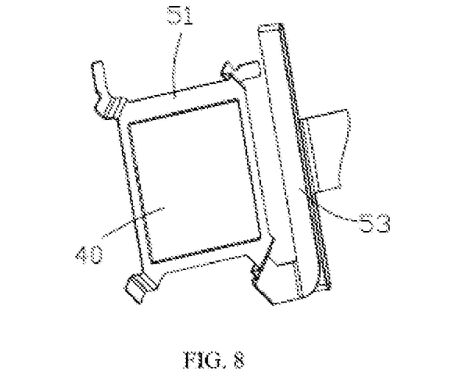
FIG. 8 is a schematic diagram of the flexible substrate shown in FIG. 7 when observed from another angle.
Figure 9:
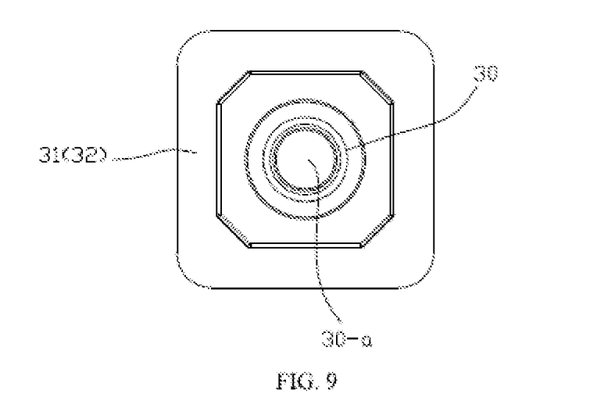
FIG. 9 illustrates an autofocus mechanism having a focus adjustment mechanism according to an embodiment of the present invention.
Figure 10:
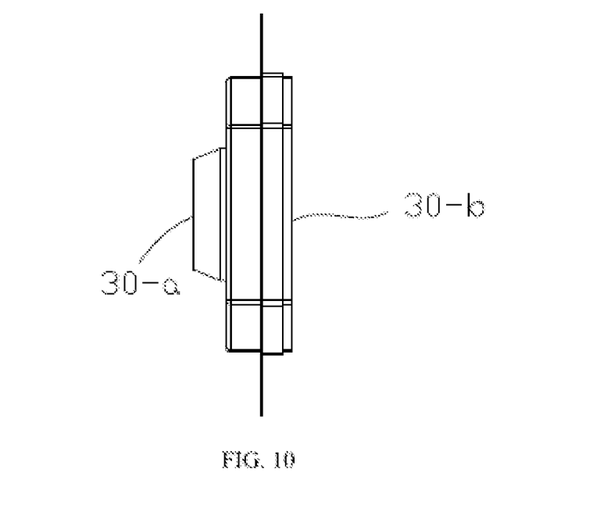
FIG. 10 is a side view of FIG. 9.
Figure 11:
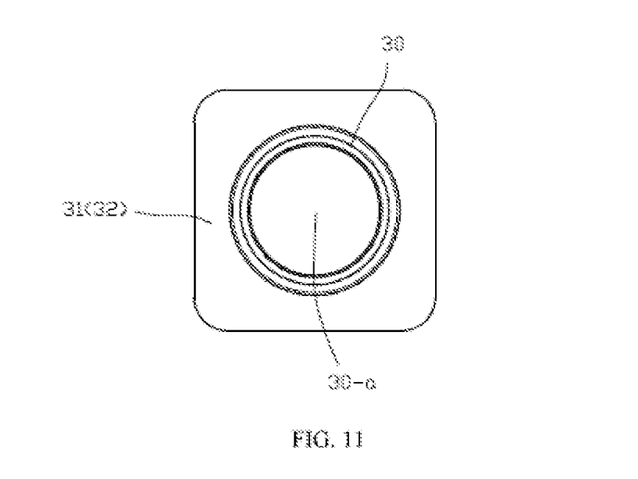
FIG. 11 illustrates a telescopic zoom mechanism having a focus adjustment mechanism according to an embodiment of the present invention.
Figure 12:
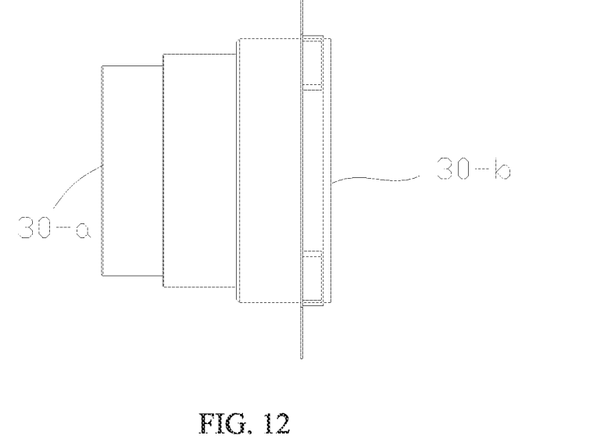
FIG. 12 is a side view of FIG. 11.

The anti-vibration mechanism 60 further includes a base A10-a, and the base A 10-a may be a plate made of metal. As shown in FIG. 1, in a space formed by the base A 10-a and a case A 11-a, an anti-vibration magnet B 75 fixed to the base A 10-a and an anti-vibration magnet A 74 fixed to the case A 11-a are provided.

The anti-vibration mechanism 60 further includes a ball member for holding the imaging element 40 in a frame assembly to enable the imaging element 40 to smoothly move in a frame assembly. A driving member for driving the imaging element 40 to move is an electric actuator. The electric actuator may be an anti-vibration coil 70.

An electric actuator member for movement (i.e., the anti-vibration coil 70), an imaging element support frame 14, and an anti-vibration magnetic yoke 72 are provided on a support frame 12-a that supports a ball 15 on the base A10-a and on a movable frame 13-a that can support the ball 15 on the support frame 12-a. The imaging element support frame 14 is installed with the imaging element 40 and a flexible substrate A50 that is used for delivering a signal line and a power line to the imaging element 40 and the electric actuator, in order to exchange external signals and power.

The support frame 12-a may be made of resin, and the base A10-a and the support frame 12-a may be formed into one piece.

In addition, an anti-vibration Hall sensor 71 is mounted on the flexible substrate A50 and is configured to read a magnetic force of the anti-vibration magnet B75 and provide feedback.

A bottom surface of the base A10-a has an aperture for allowing the flexible substrate A50 to communicate with the outside, and the aperture is closed by a cover plate 20.

The anti-vibration coil 70 on the movable frame 13-a described above is configured to be clamped by the anti-vibration magnet B75 fixed to base 10-a and the anti-vibration magnet A74 fixed to the case A11-a, and an electromagnetic force generated by the anti-vibration coil 70 when energized effectively acts on the anti-vibration magnet A74 and the anti-vibration magnet B75.

The imaging element support frame 14, the anti-vibration coil 70, the anti-vibration Hall sensor 71, and the anti-vibration magnetic yoke 72 mounted on the movable frame 13-a, and the flexible substrate A or the flexible substrate B are driven by interaction of an electromagnetic force generated by the anti-vibration coil 70 when energized with the anti-vibration magnet A74 and the anti-vibration magnet B75, so as to prevent vibration.

The anti-vibration magnetic yoke 72 is arranged and fixed to a side of the movable frame 13-a that does not face the anti-vibration magnet B75.

The above-mentioned base A10-a and base B10-b have support member grooves 10-c that are configured to hold the ball 15 for sliding with the support frame 12-a. In addition, an opposing part of the support frame 12-a also has a support member groove 12-b of the support frame. Further, an opposing part of the support frame 12-a that faces the movable frame 13-a have support member grooves 12-c of the support frame, and the movable frame 13-a also has a support member groove 13-b of the movable frame. These support member grooves have such a surface accuracy that allows the ball 15 to rotate smoothly.

Regarding the support member groove 10-c of the base, the support member groove 12-b of the support frame 12-a, the support member groove 12-c of the support frame 12-a, and the support member groove 13-b of the movable frame, since each of these grooves is a groove corresponding to a moving direction, the grooves also have an effect of limiting the movement direction and preventing rotating in a direction other than the desired movement direction.

With the support of the support member groove 10-c of the base, the support member groove 12-b of the support frame, the support member groove 12-c of the support frame, and the support member groove 13-b of the movable frame, and the use of a ball 15 by the sliding part, it enables sliding with a low load, and upon pressurization, the vibration can be reliably removed.

The direction in which the above-mentioned vibration is removed is from the anti-vibration magnetic yoke 72 mounted to the movable frame 13-a towards the anti-vibration magnet B75 mounted to the base A10-a, and is consistent with a direction determining a distance of the movable frame 13-a from the base A10-a and the support frame 12-a, enabling stable position detection. The anti-vibration magnetic yoke 72, which is opposed to the anti-vibration magnet B75 mounted to the base A10-a, is thinner than the anti-vibration magnet B75, and is configured generate an attractive force for center holding the movable frame 13-a. That is, when the movable frame 13-a moves, the anti-vibration magnetic yoke 72 functions as a magnetic spring that uses magnetism to hold the movable frame 13-a at a predetermined position (i.e., a center of a movement range in an embodiment).

As described above, the support frame 12-a is movably held on the base A10-a by using the ball 15, and the movable frame 13-a is movably held on the support frame 12-a by using the ball 15.

In addition, the anti-vibration magnetic yoke 72 provided on the movable frame 13-a applies a force in a direction towards the anti-vibration magnet B75 provided on the base A10-a or the base B10-b. The anti-vibration magnetic yoke 72 performs center holding of the moving direction, and has functions of preventing falling off of the support frame 12-a and removing vibration between blocks while having a function of effectively using leakage magnetic flux of the anti-vibration coil 70 for the driving force, thereby reducing the parts greatly.

By providing the anti-vibration Hall sensor 71, it allows to detect magnetism of the anti-vibration magnet B75 mounted to the base A10-a, and to detect positions of the movable frame 13-a and the support frame 12-a. Therefore, it is possible to perform vibration correction adjustment with higher precision, so as to achieve accurate control.

The anti-vibration coil 70 may be a coil winding mounted and fixed to the imaging element support frame 14 and the movable frame 13, or an electric-conductive pattern directly formed on the flexible substrate A50.

The flexible substrate A50 of the anti-vibration mechanism 60 for the imaging element is arranged to be bent towards a lower side of the imaging element 40, so that a counter-acting force of the flexible substrate A50 can be reduced by freely driving in driving directions of two axes. Therefore, it can be folded at least once in the two axes. Signal lines and power lines are arranged outside the new mechanism 100 required by the camera device, so as to form a folded portion 52 of the flexible substrate A.

In order to delivery all signal lines and power lines of the anti-vibration mechanism 60 for the imaging element and the imaging element 40, the above-mentioned flexible substrate A50 further includes signal lines and power lines guided to the autofocus mechanism 31 that hold the lens 30 and has the focus adjustment mechanism and other devices related to the lens 30.

The flexible substrate A50 can also be arranged at a side surface of the anti-vibration mechanism for the imaging element, like the flexible substrate B51. In this case, a folded portion 53 of the flexible substrate B can be formed. In this case, a member having a space for receiving the flexible substrate B51 (like the base B10-b and the case B11-b) can be formed.

In this case, all the signal lines and power lines described above are still included.

In an embodiment, the device for driving the lens may be a telescopic zoom mechanism 32 having a focus adjustment mechanism or a tilt hand tremor correction mechanism (not shown) that achieves anti-vibration by tilting the lens.

Figure 13:
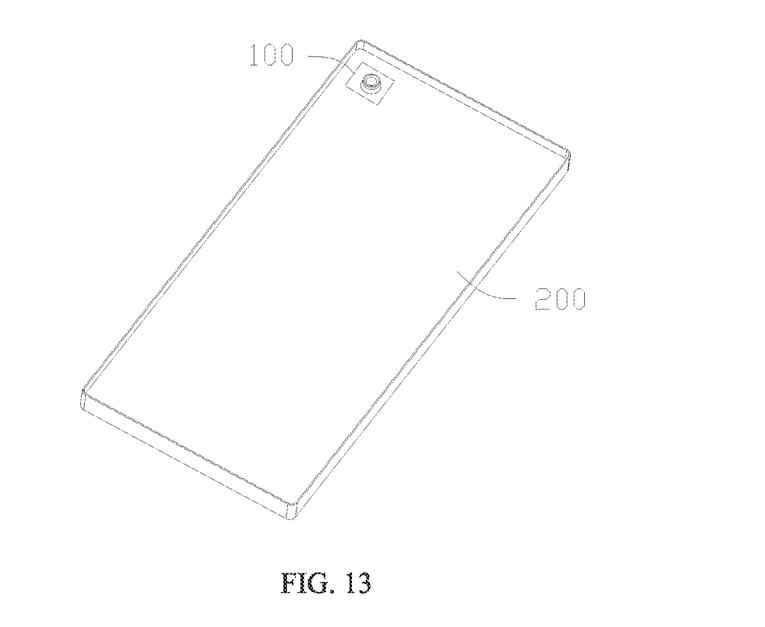
FIG. 13 illustrates a portable electronic device (portable information terminal) equipped with an anti-vibration mechanism for the imaging element of the present invention.

The anti-vibration mechanism 60 for the imaging element can be used for, for example, a camera device for a portable information device 200 such as a smart phone, a feature phone, and a tablet device shown in FIG. 13.

The above description are merely preferred embodiments of the present invention, and a protection scope of the present invention is not limited to the above-described embodiments. Equivalent corrections or modifications made by those skilled in the art based on the disclosure of the present invention are all included in the scope claimed by the claims of the present invention.

What is claimed is:

1. An anti-vibration mechanism for an imaging element, the anti-vibration mechanism is configured to correct hand tremor by moving the imaging element in a plane perpendicular to the optical axis direction comprising: a frame assembly, a ball member, a driving member and a flexible substrate;

wherein the frame assembly comprises a movable frame, a support frame and a base set in sequence along a direction parallel to an optical axis, the ball member is set both between the movable frame and the support frame and between the support frame and the base; the support frame is provided with grooves on opposite sides along the direction parallel to the optical axis for holding the ball member;

the imaging element is set on the base so as to be movable along two axes in the plane perpendicular to the optical axis;

a driving member is an electric actuator configured to drive the imaging element to move, comprising a first anti-vibration magnet, an anti-vibration coil and a second anti-vibration magnet set in sequence along the direction parallel to the optical axis;

the flexible substrate configured to transmit a signal of the imaging element and supply power to the electric actuator.

2. The anti-vibration mechanism for the imaging element as described in claim 1, wherein the movable frame is provided with a groove for holding the ball member.

3. The anti-vibration mechanism for the imaging element as described in claim 2, wherein the base is provided with a groove for holding the ball member.

4. The anti-vibration mechanism for the imaging element as described in claim 1, wherein a magnetic yoke is provided on the movable frame, and the electric actuator exerts a force in a direction in which the anti-vibration magnet and the magnet yoke attract each other.

5. The anti-vibration mechanism for the imaging element as described in claim 1, wherein the base is a plate made of metal, the support frame is made of resin, and the base and the support frame are formed into one piece.

6. The anti-vibration mechanism for the imaging element as described in claim 1, wherein the flexible substrate is bent at least twice so as to form a folded portion, the folded portion is set at a back side of the imaging element along the optical axis direction, corresponding to the axes along which the imaging element moves.

7. The anti-vibration mechanism for the imaging element as described in claim 1, wherein the flexible substrate is bent at least twice so as to form a folded portion, the folded portion is set farther from the optical axis than the anti-vibration coil, corresponding to the axes along which the imaging element moves.

8. A camera, comprising anti-vibration mechanism for the imaging element as described in claim 1.

9. An electronic device, comprising the camera as described in claim 8.

* * * * *